United States Patent [19]

Robinson

[11] Patent Number: 5,433,241
[45] Date of Patent: Jul. 18, 1995

[54] FUEL PRESSURE REGULATOR/FUEL FILTER MODULE

[75] Inventor: Barry S. Robinson, Newport News, Va.

[73] Assignee: Siemens Automotive L.P., Auburn Hills, Mich.

[21] Appl. No.: 226,912

[22] Filed: Apr. 13, 1994

[51] Int. Cl.[6] .............................................. G05D 16/08
[52] U.S. Cl. ...................................... 137/115; 137/549
[58] Field of Search ................. 123/459, 514; 137/115, 137/116, 549

[56] References Cited

U.S. PATENT DOCUMENTS

| | | | |
|---|---|---|---|
| 5,078,167 | 1/1992 | Brandt | 137/115 X |
| 5,170,764 | 12/1992 | Tuckey | 123/514 X |

Primary Examiner—Robert G. Nilson
Attorney, Agent, or Firm—Russel C. Wells

[57] ABSTRACT

The module contains a tubular filter cartridge within an enclosure and a fuel pressure regulator mounted on an end wall of the enclosure. The fuel pressure regulator is entirely self-contained allowing it to be a mass-produced part that can be used in various module configurations having differently shaped enclosures and differently shaped filter cartridges. In the illustrated embodiment, the pressure regulator separably mounts on the exterior of the end wall of the enclosure. A retention ring that has certain features is used to mount the pressure regulator with a tight fit on the enclosure end wall. The enclosure also has features for a tight fit in the socket of a fuel pump module into which the pressure regulator/filter module is inserted when used.

6 Claims, 3 Drawing Sheets

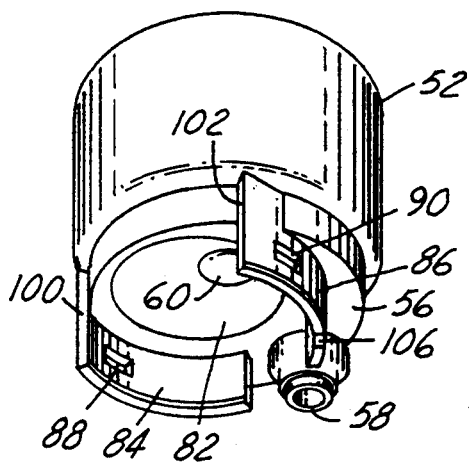

FUEL PRESSURE REGULATOR/FUEL FILTER MODULE

FIELD OF THE INVENTION

This invention relates generally to fuel systems for automotive vehicles that are powered by internal combustion engines. In particular, the invention relates to a module that contains both a fuel filter and a fuel pressure regulator for both filtering and pressure regulating fuel that is pumped from a fuel tank through the module to the engine.

BACKGROUND AND SUMMARY OF THE INVENTION

An example of a device which combines a fuel filter and a fuel pressure regulator is shown in U.S. Pat. No. 5,078,167. Such a device is adapted for mounting on what is sometimes called a fuel pump module. A fuel pump module typically fits in sealed manner to an opening in a wall of a fuel tank and contains an electrically operated fuel pump. Fuel that has entered the pump module from the fuel tank is pumped first through the combination pressure regulator/filter device and then through a conduit extending from the pump module to a fuel rail assembly on an engine. The fuel passing to the engine is filtered and pressure-regulated by the combination filter/pressure regulator device. An advantage of a device of this general type is that only a single fuel conduit is required between the fuel tank and the engine. In other words, a return conduit that returns excess fuel from the engine to the tank can be eliminated.

The device of U.S. Pat. No. 5,078,167 comprises a fuel pressure regulator that has as part of its internal mechanism a specially constructed chamber that senses the fuel pressure at the outlet of the device so that the pressure regulator can thereby compensate for any changes in pressure drop across the filter element, such as those which may occur due to clogging of the filter element over its useful life. Excess fuel is not pumped through the filter element, but rather falls back into the pump module before it ever reaches the filter element. The construction of that patented device is relatively complicated, comprising a number of individual parts that have to be assembled together so that the various functions can be performed in the manner described. Moreover, it appears that the patented combination device is not readily adaptable to fit varying packaging requirements for different automobile models.

A fuel pressure regulator/fuel filter module that is less complicated to assemble and that is more readily adaptable to different packaging requirements would be an improvement on the patented combination fuel filter/fuel pressure regulator. The present invention relates to such a module in which a self-contained fuel pressure regulator is assembled to the module thereby avoiding the need to integrate the fuel pressure regulator's internal mechanism internally into the module, as is done in the patented device. Moreover, by mounting the self-contained fuel pressure regulator on the exterior of the module by means of a separable attachment, it is possible to conveniently install and remove the pressure regulator on and from the module as a self-contained unit. Furthermore, the use of a self-contained fuel pressure regulator offers the potential for its use as a common component of different module models needed for various packaging requirements, and this promotes manufacturing economy because of economies of scale.

Additional features, advantages, and benefits of the present invention will be seen from the ensuing description that is accompanied by claims and drawing figures and illustrated in a presently preferred embodiment according to the best mode contemplated at this time for carrying out the invention.

BRIEF DESCRIPTION OF THE DRAWINGS

FIG. 4 is an enlarged perspective view of another of the parts by itself.

FIG. 5 is a non-exploded perspective view of the inventive module.

FIG. 6 is a view similar to FIG. 5 but from a different direction.

FIG. 7 is a perspective view of FIG. 1 showing the inventive module disposed in fully inserted association into a socket of the pump module.

DETAILED DESCRIPTION OF THE PREFERRED EMBODIMENT

Figure 1:
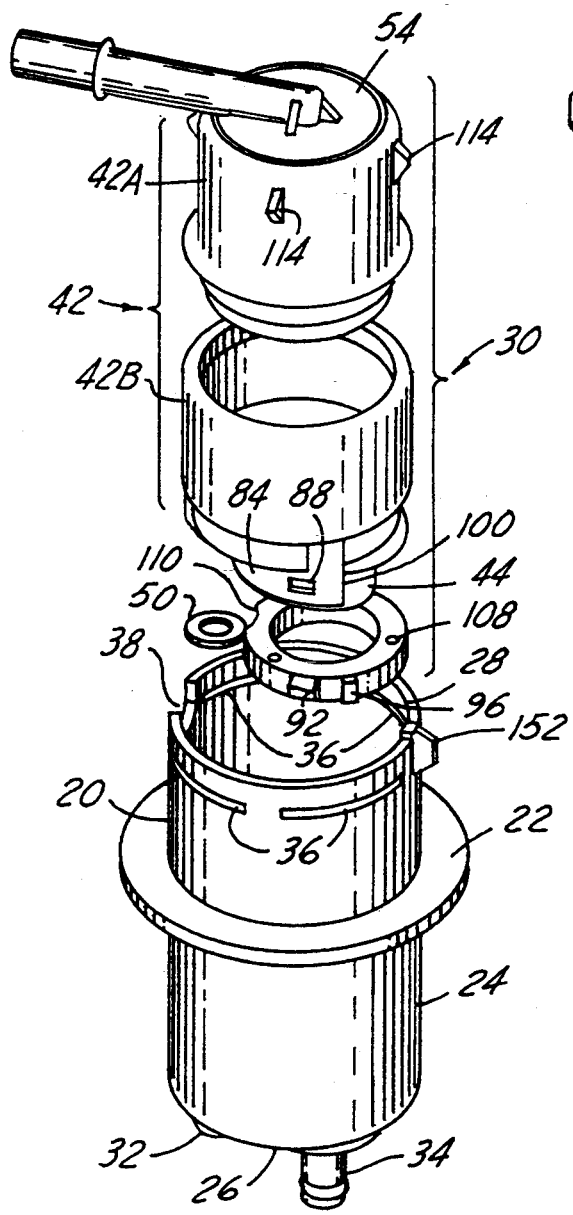
FIG. 1 is an exploded perspective view of a fuel pressure regulator/fuel filter module embodying principles of the invention, including a portion of a pump module on which the pressure regulator/filter module is mounted.
Figure 2:
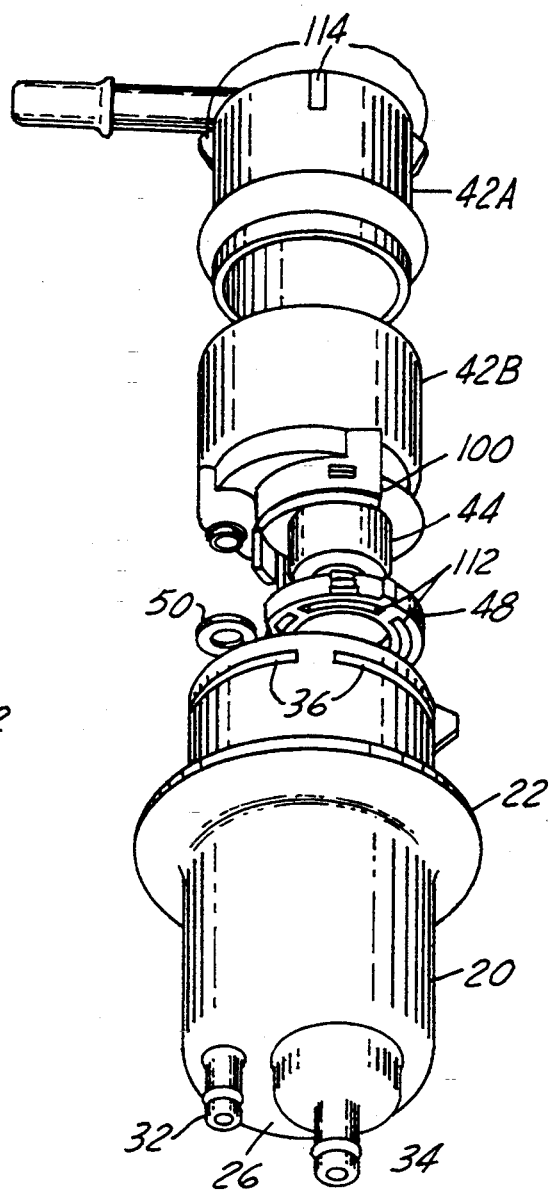
FIG. 2 is a perspective view of the module of FIG. 1 viewed from a different direction.
Figure 3:
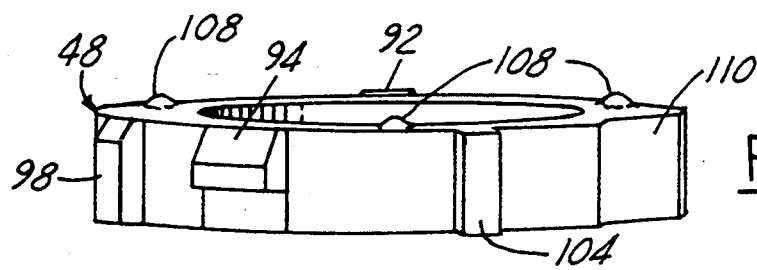
FIG. 3 is a perspective view of one of the parts shown in FIGS. 1 and 2 by itself, but on an enlarged scale.

The parts that can be seen in FIGS. 1 and 2 include a socket 20 that is integrally formed in a wall 22 (typically a top wall) of a housing of a fuel pump module. Socket 20 comprises a circular cylindrical sidewall 24 extending through pump module wall 22 and an bottom end wall 26 that is below the level of wall 22. Socket 20 comprises an open top 28 to allow for insertion of a fuel pressure regulator/fuel filter module 30 in accordance with the present invention.

Bottom wall 26 comprises an inlet nipple 32 and a return nipple 34. In use, a conduit (not shown) from a fuel pump (also not shown, but typically at the bottom of the fuel pump module) is fitted to nipple 32 for conveying fuel that has entered the pump module from the supply in the tank, from the fuel pump to that nipple. Nipple 34 allows return fuel to fall back into the pump module. Just slightly below the edge of open top 28 are four slots 36 that extend through sidewall 24. These are used for a retention clip, to be described later in connection with FIGS. 11-13. Additionally, there is a notch 38 that extends downward from that edge, and diagonally opposite notch 38 is a formation 40 that provides for the retainer clip (to be described in connection with FIGS. 11-13) to be self-retaining on the socket for keeping the inserted module 30 securely inside the socket.

Module 30 comprises an enclosure 42 that is formed by two separate parts 42A, 42B. Additionally, module 30 comprises a self-contained fuel pressure regulator 44 and a tubular filter cartridge 46 (the latter being shown in FIG. 8). A retainer ring 48, preferably a molded part composed of a fuel-tolerant plastic, retains pressure regulator 44 separably mounted on enclosure 42 on the exterior of the enclosure by fitting over the lower end of the pressure regulator and against a flange that extends around the outside of the regulator. There is also a small flat ring 50, shown in FIGS. 1 and 2, that is attached to a portion of part 42B in a manner to be subsequently explained.

Figures 8, 9, 10:
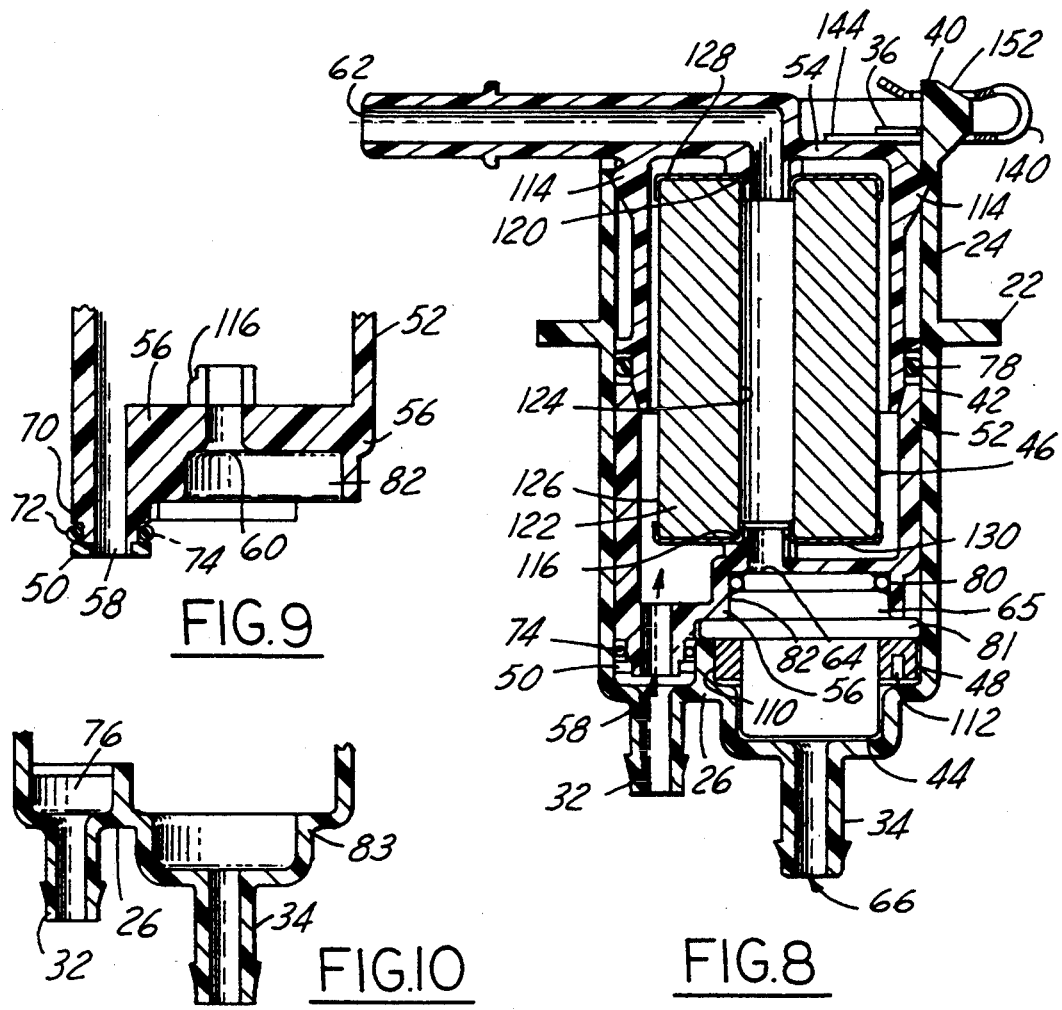
FIG. 8 is a partial longitudinal cross-sectional view through a portion of the inventive pressure regulator/filter module.
FIG. 9 is a fragmentary cross-sectional view of an end portion of the enclosure of the inventive pressure regulator/filter module.
FIG. 10 is a fragmentary view also in cross-section illustrating an end portion of the fuel pump module's socket with which the portion of FIG. 9 is directly associated.

When the two enclosure parts 42A, 42B, which are of fuel-tolerant plastic, are fitted together in the manner shown in FIG. 8 and joined and sealed, such as by sonic welding, to form enclosure 42, the enclosure may be considered to comprise a cylindrical sidewall 52 and end walls 54 and 56. End wall 56 contains a first port 58 and a second port 60. End wall 54 contains a third port 62 at the end of a right angle nipple extending from that end wall. FIG. 8 shows module fully assembled into socket 20. Port 58 is placed in communication with nipple 32 in a fluid-tight manner while port 60 is placed in communication with a pressure regulating port 64 in one end wall of a housing 65 of pressure regulator 44. Pressure regulator 44 comprises a return port 66 (FIGS. 5 and 6) in an end wall of housing 65 that is opposite the end wall containing port 64, and return port 66 registers with nipple 34 so that return fuel can pass through them and fall back into the pump module. Notch 38 provides clearance for the right angle nipple comprising port 62.

Port 58 is made fluid-tight with nipple 32 by the joining of ring 50 with the reduced diameter end of an integral nipple 70 of part 42B to create a groove 72 for an O-ring seal 74 so that the O-ring seal seals between nipple 70 and an enlargement 76 of nipple 32 internally of socket 20 just inside the socket's bottom wall 26 when module 30 is fully seated in socket 20. The two parts 42A, 42B are designed to provide a groove for a second O-ring seal 78 that fits around the O.D. of enclosure 42 for sealing the O.D. of enclosure 42 to sidewall 24 of socket 20. As shown by FIG. 8, a third O-ring seal 80 seals the O.D. of pressure regulator housing 65 to the surrounding wall of a multi-shouldered, downward open receptacle 82 formed in end wall 56 adjacent nipple 70. Ring 48 engages a flange 81 of the regulator housing to mount the regulator in the receptacle prior to insertion of module 30 into socket 20. The lower part of housing 65 is received in a complementary shaped portion 83 of bottom wall 26 just interior of nipple 34 so that return port 66 is aligned with nipple 34.

Receptacle 82 is partially circumferentially bounded by arcuate wall sections 84, 86 that are concentric with the receptacle. Each wall section 84, 86 contains a corresponding through-hole 88, 90. The nominal O.D. of retainer ring 48 is sized to fit closely within the I.D. defined by wall sections 84, 86. Respective catches 92, 94 are formed on the O.D. surface of retainer ring 48 for catching in respective holes 88, 90 when ring 48 is fully installed to hold pressure regulator 44 in place. Proper circumferential alignment of ring 48 is assured by designing it with axial ribs 96, 98 on its O.D. that are located so that they will only fit to the space between the axial edges 100, 102 of wall sections 84, 86. Retainer ring 48 is prevented from being assembled upside down by providing an axial key 104 at a particular location on its O.D. and an axial keyway 106 in wall section 86. If the retainer ring is attempted to be installed upside down, the key 104 will hit wall section 84 where there is no keyway. Furthermore, the top end face of ring 48 has several spaced apart bumps 108 that are designed to compress slightly during installation of ring 48 for the purpose of assuring that when the regulator is mounted on the module, there is no looseness in its fit with respect to enclosure 42 due to adverse accumulation of tolerances in the several assembled parts. Ring 48 also has a notch 110 for clearance to nipple 70 where the nipple protrudes from end wall 56, and several grooves 112 that are provided for the purpose of facilitating the fabrication of ring 48. There are also several radial projections 114 formed on the O.D. of part 42A near the top of sidewall 52 for the purpose of avoiding looseness of module 30 radially within socket 20 that might otherwise impair the integrity of seal 78.

On the interior of wall 56 at port 60 there is a raised ledge 116 through which port 60 communicates with a central axial passage 118 extending through filter cartridge 46. On the interior of end wall 54 there is a raised ledge 120 through which port 62 communicates with passage 118. A short tubular extension on each raised ledge fits inside a respective end of passage 118. Thus, filter cartridge 46 is axially held in place within enclosure 42 between the two end walls 54, 56. Filter cartridge 46 comprises tubular filter media 122 having an I.D. surface 124 defining passage 118 and an O.D. surface 126 spaced radially outwardly of surface 124. Annular imperforate caps 128, 130 cover the axial ends of media 122. The entire surface of filter cartridge 46, except for passage 118, is exposed to fuel that enters enclosure 42 through port 58; however, in order to reach passage 118, fuel is constrained to pass radially through media 122 from surface 126 to surface 124 because it cannot pass through caps 128, 130. Thus all the fuel that enters enclosure 42 is filtered by cartridge 46. There are only two exits for the filtered fuel, one through port 62 to the engine, and the other through port 60 to fuel pressure regulator 44. Thus, pressure regulator 44 acts on filtered fuel to regulate the pressure thereof. Excess fuel is returned through the fuel pressure regulator, leaving return port 66 and passing through nipple 34 before falling back into the fuel pump module. Pressure regulator 44 is preferably of a type like that disclosed in the commonly assigned pending application of the instant inventor and Michael J. Hornby, Ser. No. 08/092,320, filed 14 Jul. 1993, wherein the return fuel flows through the diaphragm. Details of that application are incorporated herein by reference to avoid repetition.

Figure 13:
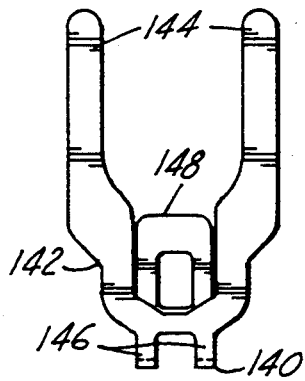
FIG. 13 is a bottom view of FIG. 11.
Figure 12:
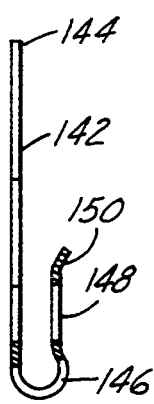
FIG. 12 is a cross-sectional view in the direction of arrows 12—12 in FIG. 11.
Figure 11:
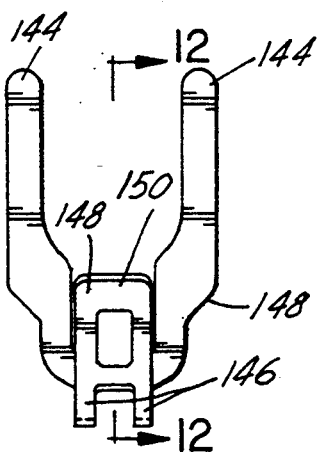
FIG. 11 is a top plan view of another of the parts by itself.

FIGS. 11-13 show a retention clip 140 that is used to hold module 30 in socket 20. Clip 140 is a one-piece metal part comprising a flat, somewhat U-shaped fork 142 having tines 144. At the base of the U are two side-by-side curved bends 146 of about 180 degrees that extend from the base of the U to an apertured tongue 148 that is spaced from, but generally parallel with, fork 142. Tongue 148 terminates in a short, leading margin 150 that is canted away from fork 142. Through-slots 36 are for acceptance of tines 144. An edge of formation 40 is inclined to form a ramp 152 leading up to, and above, the socket's rim. The formation ends at the I.D. of the socket to present a radially inwardly facing shoulder. The free ends of the tines are aligned with the two through-slots that are to immediately opposite sides of formation 40, and the clip is moved bodily radially inwardly to the socket. The tines pass in overlying relation to end wall 54 to either side of the nipple comprising port 62. Leading margin 150 rides up ramp 152 resiliently increasingly spreading the clip in the process since the fit of the tines in the through-slots is not sufficiently loose to allow the spreading to be avoided. Finally a point is reached where the aperture of the tongue registers with formation 40, and so the clip relaxes, causing the formation to lodge in the aperture. This creates an interference preventing extraction of the clip unless it is first expanded to clear the formation as it would be when it is intended to be removed. The top wall can be designed with an angle so that the tines cam the module downward into the socket during clip insertion, assuring that the module will be tightly held in place.

While a presently preferred embodiment has been illustrated and described, it should be appreciated that principles can apply to other embodiments falling within the scope of the following claims.

What is claimed is:

1. A fuel pressure regulator/fuel filter module for use in filtering and pressure-regulating fuel that is pumped from a fuel tank to an automotive engine, the module comprising:

an enclosure comprising a side wall and at least two end walls bounding an interior, a first fuel port in one of said end walls via which fuel from the tank is pumped into the module, a second fuel port in said one end wall via which excess fuel is returned to the tank, a third fuel port in the other of said end walls via which filtered, pressure-regulated fuel is delivered to the engine, a tubular fuel filter cartridge that is disposed within said enclosure and comprises filter media having an I.D. surface bounding a central passage and an O.D. surface spaced radially outwardly of said I.D. surface, means fitting an axial end of said cartridge to the other of said end walls of said enclosure to place said central passage in fluid communication with said third fuel port, means for preventing fuel that has entered said enclosure via said first fuel port from passing to said central passageway of said cartridge other than through said filter media, and a self-contained fuel pressure regulator comprising:

a housing that is disposed on said one end wall of said enclosure and having a pressure-regulating port and an excess fuel return port, and a pressure regulating mechanism within said housing that is operable to cause excess fuel to be conveyed along an excess fuel return path extending through said housing from said pressure-regulating port to said excess fuel return port when fuel pressure at said pressure-regulating port exceeds a regulation pressure, and means placing said excess fuel return path through said housing in series flow relationship with said second fuel port of said enclosure.

2. A fuel pressure regulator/fuel filter module as set forth in claim 1 in which said self-contained fuel pressure regulator is separably mounted on the exterior of said one end wall of said enclosure.

3. A fuel pressure regulator/fuel filter module as set forth in claim 2 in which said housing has a flange extending around its outside and the separable mounting comprises a retaining ring that engages said flange and attaches to the enclosure.

4. A fuel pressure regulator/fuel filter module as set forth in claim 3 in which said retention ring comprises means for eliminating any adverse effect from an accumulation of tolerances so that said fuel pressure regulator is tightly held on the one end wall by the retention ring.

5. A fuel pressure regulator/fuel filter module as set forth in claim 4 including cooperating locator means on said retention ring and the enclosure for assuring that said retention ring will be attached correctly to the enclosure.

6. A fuel pressure regulator/fuel filter module as set forth in claim 1 in which the enclosure contains compressible projections for assuring that it will be tightly received in a socket of a fuel pump module.

* * * * *